3,301,913
HYDROGENATION PROCESS

Peter Desmond Holmes and Robert Chalmers Pitkethly, Sunbury-on-Thames, Middlesex, England, assignors to The British Petroleum Company Limited, London, England, a British joint-stock company
No Drawing. Filed Mar. 19, 1964, Ser. No. 353,274
Claims priority, application Great Britain, Apr. 1, 1963, 12,780/63
4 Claims. (Cl. 260—677)

United States Patent 3,215,640 discloses a process which comprises hydrogenating a carbon-containing compound over a support catalyst containing nickel which, under the operating conditions, is present in major proportion as elemental nickel, said catalyst having been prepared by treating a catalytic material comprising elemental nickel on a catalyst support with (a) elemental sulphur or (b) an organic sulphur compound or (c) $H_2S$ or (d) $CS_2$ or (e) a mixture of two or more components, selected from (a), (b), (c) and (d), said treatment being caried out under conditions such that a minor proportion of the nickel present in the catalytic material is thereby combined with sulphur.

It has now been found that the process claimed in the above mentioned specification can be applied to the selective hydrogenation of acetylenes in the presence of dienes. Suitable process conditions for the operation have also been found.

According to the present invention there is provided a process which comprises hydrogenating a carbon-containing compound, over a supporting catalyst containing nickel which, under the operating conditions, is present in major proportion as elemental nickel, said catalyst having been previously modified by treatment with (a) elemental sulphur or (b) an organic sulphur compound or (c) $H_2S$ or (d) $CS_2$ or (e) a mixture of two or more components, selected from (a), (b), (c) and (d), said treatment being carried out under conditions such that a minor proportion of the nickel present in the catalyst is thereby combined with sulphur, characterised in that the feedstock is a hydrocarbon feedstock containing a major molar proportion of dienes and a minor molar proportion of acetylenes, in relation to each other, and that the conditions are such that at least a major proportion of the acetylenes is selectively hydrogenated and not more than a minor proportion of the dienes is hydrogenated.

The terms "major molar proportion" and "minor molar proportion" as applied to the feedstock composition mean respectively "at least 50 mol percent" and "less than 50 mol percent." Similarly the terms "major proportion" and "minor proportion" as applied to the extent of hydrogenation mean "at least 50%" and "less than 50%" respectively. Preferably not more than 30% of the dienes are hydrogenated.

Preferably the feedstock, insofar as it contains dienes and acetylenes, consists of a mixture of more than 90 mol percent of a diene or, in total, of dienes and not more than 10 mol percent of an acetylene or, in total, of acetylenes.

Preferably the dienes are $C_3$ and/or $C_4$ dienes, particularly 1:3 butadiene, and when this is so the acetylenes will be $C_3$ or $C_4$ acetylenes particularly methyl acetylene.

The dienes and acetylenes may be substantially the only hydrocarbons passed over the catalyst, the process being thus suitable for the selective hydrogenation of butadiene streams. However the feedstock may also contain other hydrocarbons, particularly hydrocarbons which are inert under the hydrogenation conditions, for example saturated hydrocarbons, and also aromatics and mono-olefins which are likely to be little affected because of the selectivity of the catalyst used.

Preferably the diene, or in total dienes, constitute more than 20 mol percent of the feedstock, more particularly more than 50 mol percent.

In general the severity of hydrogenation will be controlled by suitable choice, in combination, of reactor temperature and space velocity; change of pressure will usually have a less marked effect. In general the reaction temperature will be within the range 90 to 150° C. and preferably will lie in the range 100 to 130° C.

The reaction will be carried out in the presence of a free hydrogen containing gas; the feedstock may be in liquid phase, gaseous phase or mixed phase.

In general the gas hourly space velocity will lie in the range 100–10,000 vol./vol./hr., the reaction pressure will lie in the range 0–1000 lbs./sq. in. gauge, and the hydrogen:hydrocarbon mole ratio will be in the range 0.5 to 100, based on the unsaturates which are to be hydrogenated.

It is a particular advantage of the process of the present invention that the hydrogenation of the feedstock may be carried out in the presence of an excess of hydrogen over the amount required for the desired hydrogenation and thus control of the amount of hydrogenation solely by limiting the quantity of hydrogen fed is avoided. However, the amount of excess hydrogen does have some influence on the extent of hydrogenation, increase in the hydrogen:hydrocarbon mole ratio tending to increase the hydrogenation. Either pure hydrogen or known hydrogen-containing gases, for example catalytic reformer off-gases, may be used as the source of hydrogen.

The preparation of the catalyst and its activation may be carried out in any convenient manner, the following three methods being merely illustrative.

(a) The catalyst may be prepared on the base by an impregnation technique by dissolving in water a nickel salt, for example nickel nitrate, and impregnating the support material with it. The support material may be conveniently in the form of granules or pellets of any desired size formed from ground support material. After impregnation, the catalyst is dried and is then in a form in which it can be stored for long periods without deterioration. In order to use the catalyst it must be activated by heating to decompose the salt; in the case of the nitrate this requires a temperature of about 500–550° C., and the nickel will be converted to the oxide. Final activation by reduction to metallic nickel can be carried out in a stream of hydrogen or hydrogen containing gas at a temperature of 150° to 600° C. and at a pressure of 0–200 lbs./sq. in. gauge. The time of treatment depends upon the temperature. Typical conditions using a sepiolite catalyst support are 16 hours at 500° C. and atmospheric pressure; no damage results to the sepiolite however, if it is heated at a temperature above 600° C.

(b) The catalyst may be prepared by milling dry nickel formate with powdered catalyst support, and subsequently pelleting the mixture. The advantage of this method of preparation is that a salt such as nickel formate reduces directly to nickel (without going through the oxide state) in a non-oxidising atmosphere, for example in an inert gas or hydrogen stream at a temperature of 150° C. to 300° C. At 250° C. treatment for 4 hours will usually be appropriate. This method has the advantage that it is not necessary to heat large quantities of catalysts to temperatures of 500° C. and higher.

(c) The catalyst may be prepared by a technique which utilises the water soluble complex formed when nickel formate dissolves in ammonia. This complex breaks down on heating to give nickel formate again. By using this water-soluble complex, catalysts may be prepared by the impregnation technique from normally water insoluble compounds such as nickel formate. The compound is dissolved in ammonia solution and the solution used for the impregnation of granules or pellets of the support material; the catalyst is then dried, and activation is carried out by the method described under (b).

After the reduction, the nickel catalyst should not be allowed to come into contact with air or spontaneous oxidation of the nickel to nickel oxide may occur.

Preferably the activated catalyst contains 1 to 50% wt., more particularly 5 to 25% wt., of elemental nickel, based on the total weight of catalyst.

Suitable catalysts for treatment with a sulphur-containing material and use in the process of the invention are nickel supported on alumina, kieselguhr, chalk and silica gel.

A preferred catalyst is nickel-on-sepiolite.

Sepiolite is a commercially available clay mineral, which occurs naturally and which can also be prepared synthetically. It has the ideal formula

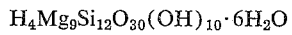

$$H_4Mg_9Si_{12}O_{30}(OH)_{10} \cdot 6H_2O$$

and is also known as meerschaum. Further information on sepiolite and its properties may be found in "Chemistry and Industry" of November 16, 1957, at pages 1492 to 1495.

Sepiolite possesses an advantage over some other bases, for example alumina, in that there is no reaction of the nickel salt with sepiolite during the heating of the catalyst to convert the nickel salt to oxide, and the final reduction can be carried out at a lower temperature than that necessary for nickel-alumina catalysts.

In general, when a supported elemental nickel catalyst is treated with a sulphur-containing compound at elevated temperature, the extent of sulphiding is progressive as long as sulphur-containing compounds continue to pass over the catalyst and ultimately there is obtained a very highly sulphided catalyst.

We have found that certain classes of sulphur-containing compounds as hereinafter described are only effective for a more limited degree of sulphiding; thus after a certain degree of sulphiding is reached, the use of further quantities of these sulphur-containing compounds, when used under the same conditions as before, does not substantially change the degree of sulphiding. In some cases the degree of sulphiding may be substantially independent of the sulphiding conditions and thus the degree of sulphiding will be determined by the selection of the sulphur-containing compound.

Sulphiding conditions which may be varied include temperature, pressure and flow rate. Usually the sulphiding agent will be used in the vapour phase.

By the use of an organic sulphur compound which is only capable of effecting a limited degree of sulphiding it is possible to obtain a catalyst which has been uniformly sulphided on the surface of the catalyst. Thus while it would be possible to use, for sulphiding, a calculated quantity of an organic sulphur compound which does not possess this property, the resulting catalyst will be sulphided to an undesirably high degree when the catalyst surface is readily accessible to the organic sulphur compound; while it is possible to achieve an average degree of sulphiding equal to a required value, the catalyst will be in part, over-active and, in part under-active.

For the purpose of the present specification we classify sulphur-containing compounds as follows:

*Class A.*—Thiophenes, thiacycloalkanes having at least 4 carbon atoms in the ring; and dialkyl-mono-sulphides.

*Class B.*—Sulphur containing organic compounds not included in Class A (for example mercaptans, thiacyclobutane, dialkyl disulphides, elemental sulphur, hydrogen sulphide and carbon disulphide).

Compounds of Class A effect only a limited degree of sulphiding, as described hereinbefore, and these compounds are preferred for use in modifying the catalytic material used in accordance with the present invention.

Thus a preferred class of organic sulphur compounds for use in the treatment of the catalyst consists of the thiophenes.

Preferred thiophenes have 4 to 10 carbon atoms/molecule. Suitable there is used a gasoline containing sulphur predominately or entirely present as thiophenes. A preferred gasoline is a steam cracked gasoline produced by cracking, in the presence of steam, petroleum distillate fractions, for example primary flash distillate or naphthas, fractions preferably boiling within the range 50° C. to 250° C. Preferred cracking temperatures for the production of gasolines for use in the process of the invention exceed 1100° F. to 1700° F. (593–927° C.) and suitable cracking pressures lie in the range 0 to 60 lbs./sq. in. gauge. Preferably the gasolines have a total sulphur content of 0.005 to 0.2% by weight.

Another class of organic sulphur compound which may be employed consists of the mercaptans. However in general when using elemental sulphur, $H_2S$, $CS_2$ or organic sulphur compounds other than Class A compounds, the use of an excess of these materials over the amount containing the amount of sulphur required for reaction with a minor proportion of the nickel, will lead to excessive sulphiding of the catalyst; when using these materials they will be employed in the stoichiometric quantities required for the sulphiding of the required proportion of the elemental nickel present in the catalyst.

Usually the treatment of the catalyst to cause sulphiding will be carried out at a temperature from 0–200° C. and at any convenient pressure, being sub-atmospheric, atmospheric or super atmospheric.

If desired the treatment of the catalyst may be carried out in the presence of hydrogen.

Usually the amount of the sulphur-containing material which is reacted with the catalyst will be such that it contains 1 to 40 mol percent of sulphur, based on the elemental nickel content of the untreated catalyst.

The invention is illustrated but not limited with reference to the following example.

*Example*

10 ml. of nickel-on-sepiolite catalyst containing 10% by wt. of elemental nickel was activated in hydrogen (100 v./v./hr.) at 250° C. for 4 hours at atmospheric pressure and partially sulphided by processing a n-heptane solution containing 0.5 gram of thiophene per 100 ml. heptane at 3 v./v./hr., and at 100° C. with hydrogen at 1000 v./v./hr. for 4 hours at atmospheric pressure. The sulphur:nickel atomic ratio of the catalyst was 0.06.

A feed blend of gaseous olefinic $C_4$ hydrocarbons and hydrogen (10–15 percent vol.) was then passed at 1000–1200 v./v./hr. and atmospheric pressure over the catalyst at various temperatures. Samples of feed and of products taken after 2–3 hours operation under steady conditions were analysed by gas chromatography with the results shown in the following table.

|  | Feed | Catalyst Temperature, °C. | | | | | |
|---|---|---|---|---|---|---|---|
|  |  | 100 | 115 | 130 | 140 | 150 | 166 |
| Hydrocarbon Composition: |  |  |  |  |  |  |  |
| $C_1$, Mol percent |  | 0.5 | 0.2 | 0.2 | 0.1 | 0.1 | 0.1 |
| $C_2$, Mol percent | 2.2 | 2.0 | 1.9 | 1.6 | 1.5 | 1.3 | 1.1 |
| $C_3$ [1] Mol percent | 9.15 | 10.13 | 10.37 | 9.8 | 9.8 | 9.57 | 9.1 |
| Butanes, Mol percent | 6.8 | 7.1 | 7.1 | 7.3 | 7.2 | 7.2 | 7.4 |
| Butenes, Mol percent | 55.3 | 54.5 | 55.9 | 57.8 | 61.6 | 59.5 | 68.1 |
| Butadiene-1:3, Mol percent | 26.1 | 25.3 | 24.3 | 23.1 | 19.7 | 22.2 | 14.2 |
| Methylacetylene, Mol percent | 0.18 | 0.17 | 0.02 | 0.02 | 0.02 | 0.01 | 0.01 |
| Propadiene, Mol percent | 0.27 | 0.30 | 0.21 | 0.18 | 0.08 | 0.12 | 0.01 |

[1] Other than propadiene.

These results show that:

(a) Methyl acetylene is hydrogenated appreciably at temperatures in excess of 100, the hydrogenation being almost complete at 115° C. and being thereafter little affected by further increase of temperature.

(b) Butadiene-1:3 is not hydrogenated to any great extent at 100° C., but hydrogenation increases progressively as the temperature is increased above 100 so that at 130° C. the loss of butadiene amounts to 11% and at 166° C. the loss is 46%.

(c) The propadiene hydrogenation is generally similar to the butadiene hydrogenation, but the former is rather more easily hydrogenated. Hydrogenation is non-existent at 100° C. but at 130° C. 33% has been lost and at 150° C. 55% has been lost.

For the selective hydrogenation of methyl acetylene in the presence of either butadiene-1:3 and/or propadiene the temperature is, thus, desirably under the process conditions used, at least 100° C. The upper limit of temperature depends on the extent to which diene hydrogenation can be tolerated, but it is desirably not in excess of 130° C. The tolerable upper limit is likely to be rather lower for propadiene than for butadiene.

We claim:

1. A process for selectively hydrogenating the acetylenes in a hydrocarbon feedstock containing a molar proportion of dienes in excess of 50 mol percent and a minor molar proportion of acetylenes which comprises, contacting said feedstock with a supported catalyst containing nickel which, under the operating conditions, is present in major proportion as elemental nickel, said catalyst having been previously modified by treatment with at least one sulphur-containing compound selected from the group consisting of thiophenes, thiacycloalkanes having at least four carbon atoms per ring, and dialkylmonosulphides, said treatment being carried out under conditions such that a minor proportion of the nickel present in the catalyst is thereby combined with sulphur, the hydrogenation being carried out at a hydrogenation temperature of from 100° to 130° C., and recovering a product in which at least a major proportion of the acetylenes have been selectively hydrogenated and not more than a minor proportion of the dienes has been hydrogenated.

2. A process as claimed in claim 1 wherein the dienes are selected from the class consisting of $C_3$ and $C_4$ dienes.

3. A process as claimed in claim 1, wherein the feedstock, insofar as it contains dienes and acetylenes, consists of a mixture of more than 90 mol percent of dienes and not more than 10 mol percent of acetylenes.

4. A process as claimed in claim 1, wherein the hydrogenation space velocity is in the range 100 to 10,000 vol./vol./hr., the pressure is in the range 0 to 1,000 p.s.i.g. and the hydrogen:hydrocarbon mole ratio is in the range 0.5 to 100, based on the unsaturates to be hydrogenated.

References Cited by the Examiner

UNITED STATES PATENTS

| 2,379,670 | 7/1945 | Welling et al. | 260—677 |
| 2,511,453 | 6/1950 | Barry | 260—677 |
| 3,041,385 | 6/1962 | Bourne et al. | 260—677 |
| 3,155,739 | 11/1964 | Fleming | 260—677 |
| 3,215,640 | 11/1965 | Pitkethly et al. | 260—677 |

OTHER REFERENCES

Chem. Eng. Progress, vol. 54, No. 12, pages 48–51, Reitmeier et al.

Emmett et al.: Catalysis, vol. 5, pages 316–319.

J.A.C.S. 77, page 6390, Pines et al.

ALPHONSO D. SULLIVAN, *Primary Examiner.*